United States Patent
Ito et al.

(10) Patent No.: US 9,672,443 B2
(45) Date of Patent: Jun. 6, 2017

(54) DIMENSION REDUCTION APPARATUS, DIMENSION REDUCTION METHOD, AND COMPUTER PROGRAM PRODUCT

(71) Applicant: KABUSHIKI KAISHA TOSHIBA, Minato-ku, Tokyo (JP)

(72) Inventors: Satoshi Ito, Kanagawa (JP); Tomoki Watanabe, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 251 days.

(21) Appl. No.: 14/644,396

(22) Filed: Mar. 11, 2015

(65) Prior Publication Data

US 2015/0269123 A1   Sep. 24, 2015

(30) Foreign Application Priority Data

Mar. 20, 2014   (JP) .................................. 2014-058628

(51) Int. Cl.
*G06F 17/14*   (2006.01)
*G06K 9/62*   (2006.01)

(52) U.S. Cl.
CPC .................................. *G06K 9/6232* (2013.01)

(58) Field of Classification Search
CPC .................................................... G06K 9/6232
USPC ......................................................... 708/401
See application file for complete search history.

(56) References Cited

U.S. PATENT DOCUMENTS 5,734,796 A * 3/1998 Pao ..................... G06K 9/6232
  706/16
8,254,699 B1   8/2012 Zhao et al.

2007/0189601 A1 * 8/2007 Lee ...................... G06K 9/6232
  382/159

FOREIGN PATENT DOCUMENTS

JP   2007-299250   11/2007
JP   2010-039778   2/2010
JP   2013-097583   5/2013

OTHER PUBLICATIONS

Zou, Hui, et al.; Sparse Principal Component Analysis; Journal of Computational and Graphical Statistics; 2006; pp. 265-286; vol. 15, No. 2; American Statistical Association, Institute of Mathematical Statistics, and Interface Foundation of North America.

(Continued)

*Primary Examiner* — Tan V. Mai
(74) *Attorney, Agent, or Firm* — Amin, Turocy & Watson LLP

(57) ABSTRACT

According to an embodiment, a dimension reduction apparatus includes an obtaining device to obtain a first vector made up of elements; a generator to generate first partial vectors each made up of one or more elements of the elements; a first mapping controller to transform each first partial vector into a second partial vector by reducing number of elements constituting the first partial vector using first mapping corresponding to the first partial vector, concatenate the second partial vectors, and generate a second vector by reducing number of dimensions of the first vector; and a second mapping controller to apply, to the second vector, second mapping which maps the second vector into a space having number of dimensions not larger than that of the second vector, and generate a third vector by reducing the number of dimensions of the second vector to not larger than that of the second vector.

10 Claims, 10 Drawing Sheets

(56) References Cited

OTHER PUBLICATIONS

Kozakaya, Tatsuo, et al.; Random Ensemble Metrics for Object Recognition; IEEE International Conference on Computer Vision; 2011; pp. 1959-1966; IEEE.

Torresani, Lorenzo, et al.; Efficient Object Category Recognition Using Classemes; ECCV; 2010; pp. 776-789; Part 1, LNCS 6311; Springer-Verlag; Berlin Heidelberg.

* cited by examiner $y_{ij}$  $x_i$ $y_{ij}$  $x_i$

FIG.13

$x_{out}$   $b_1$   $W_1$   $x_1 = x_{in}$

US 9,672,443 B2

1

DIMENSION REDUCTION APPARATUS, DIMENSION REDUCTION METHOD, AND COMPUTER PROGRAM PRODUCT

CROSS-REFERENCE TO RELATED APPLICATIONS

This application is based upon and claims the benefit of priority from Japanese Patent Application No. 2014-058628, filed on Mar. 20, 2014; the entire contents of which are incorporated herein by reference.

FIELD

Embodiments described herein relate generally to a dimension reduction apparatus, a dimension reduction method, and a computer program product.

BACKGROUND

In the field of pattern recognition such as image recognition or voice recognition, in order to make use of as much information as possible that is effective for recognition purposes, it is not uncommon to use a feature vector having an extremely high number of dimensions, such as dimensions of the degree of several tens of thousands to hundreds of thousands. In that regard, there is a known approach in which the dimensions of the feature vector are reduced in number to generate a low-dimensional feature vector, and a recognition operation is performed using the low-dimensional feature vector.

As dimension reduction methods in such an approach; for example, there is a method of using principal component analysis to perform dimension reduction in such a way that the error of mean square before and after performing dimension reduction is the smallest. In this method, in the case of performing reduction from a $D_{in}$ dimension to a $D_{out}$ dimension, the high-dimensional vector of the $D_{in}$ dimension is multiplied with a $D_{out} \times D_{in}$ matrix and a low-dimensional vector of the $D_{out}$ dimension is calculated.

However, in this method, the volume of data of the $D_{in}$ dimension reaches an extremely large value. Hence, the volume of data of the $D_{out} \times D_{in}$ matrix also reaches an extremely large value. For that reason, it becomes necessary to use a memory device such as a memory having an extremely large memory capacity for storing the $D_{out} \times D_{in}$ matrix. Besides, the amount of calculations accompanying the dimension reduction also increases to enormous proportions, because of which it takes time to achieve dimension reduction.

In that regard, as another method, a technology is known in which some elements of the $D_{out} \times D_{in}$ matrix are set to be nonzero elements, thereby achieving reduction in the memory capacity required to store the $D_{out} \times D_{in}$ matrix.

However, in such a conventional technology, the nonzero elements are present in an intermittent manner. Consequently, while performing the calculations accompanying dimension reduction, the memory area is also accessed in an intermittent manner, thereby making it difficult to speed up the calculations. For that reason, it takes time to achieve dimension reduction.

2

Figure 2:
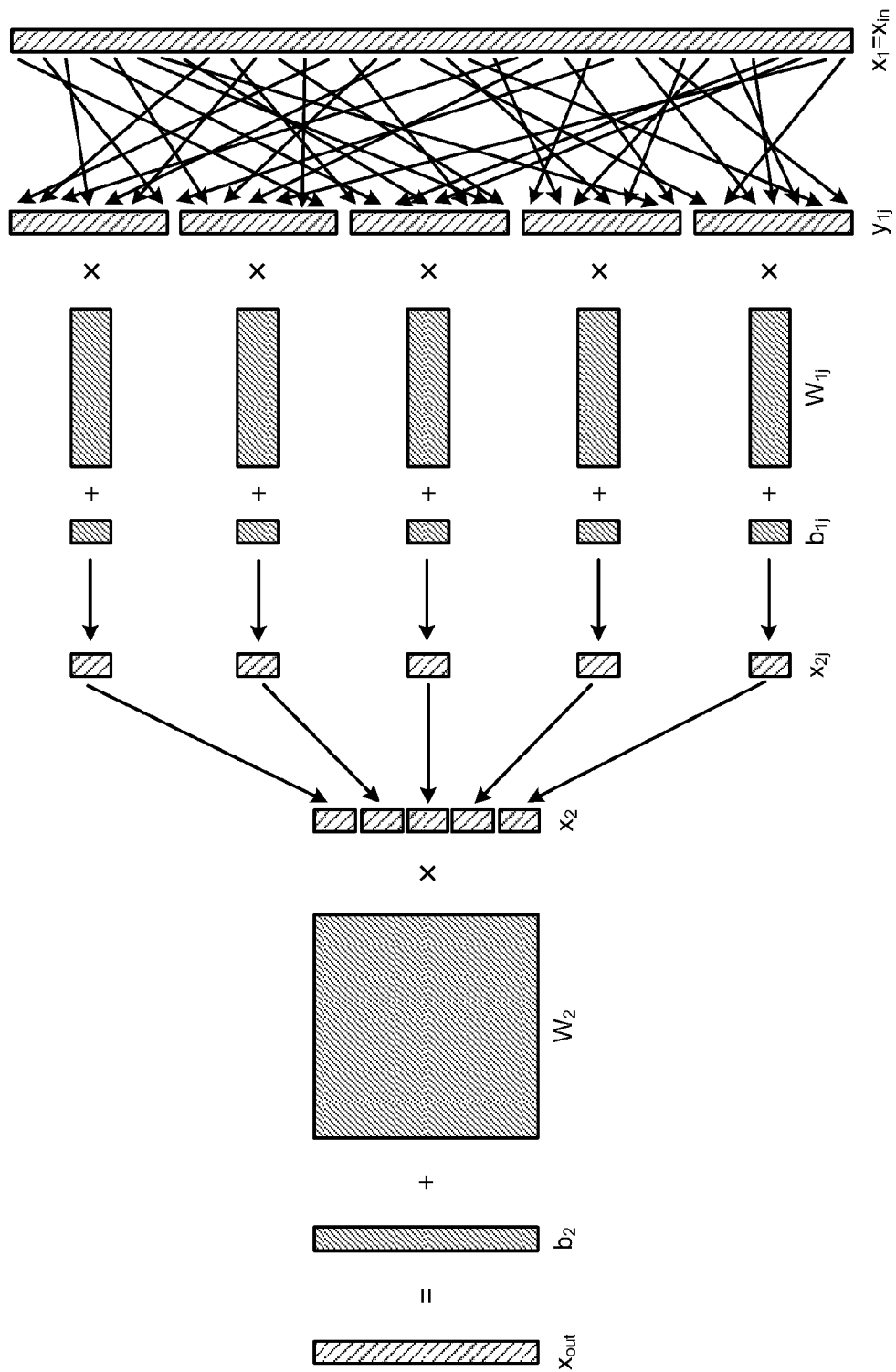
Figure 3:
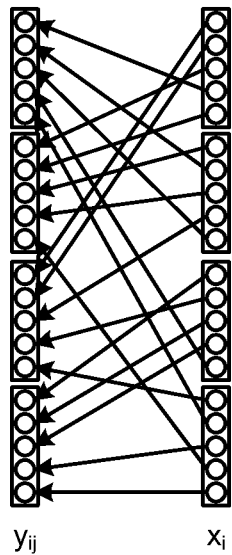
Figure 4:
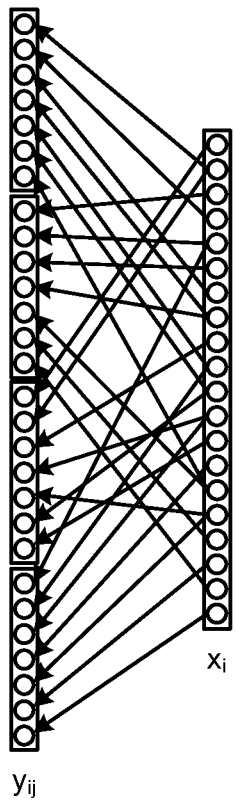
Figure 5:
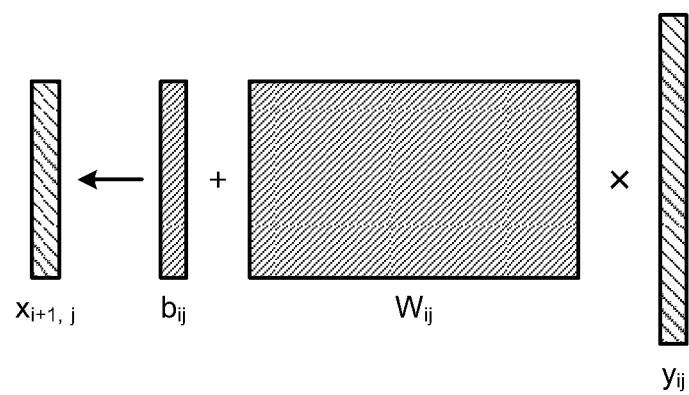
Figure 6:
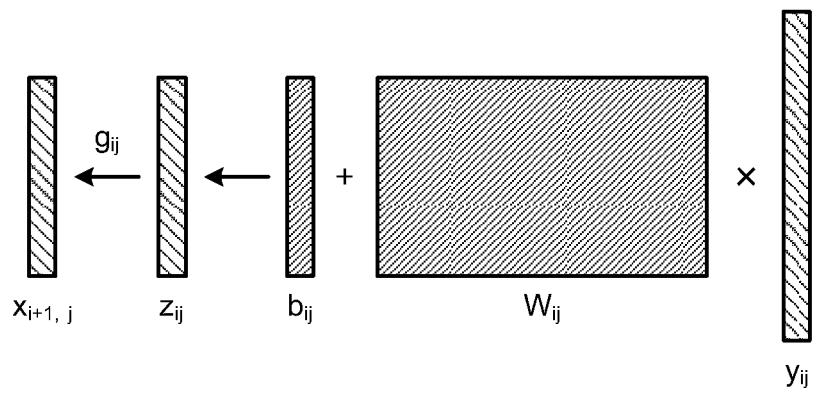
Figure 7:
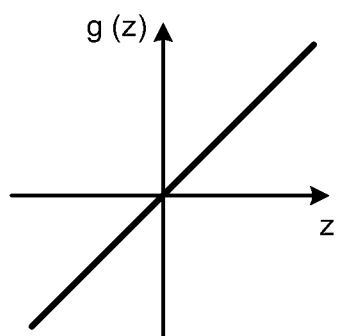
Figure 8:
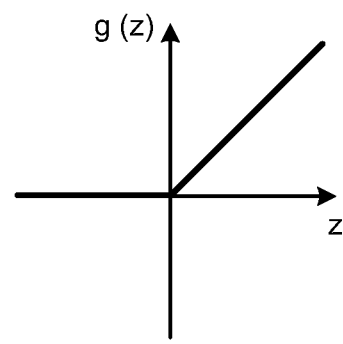
Figure 9:
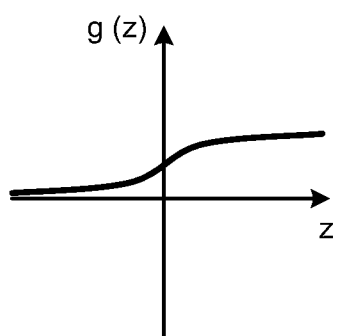
Figure 10:
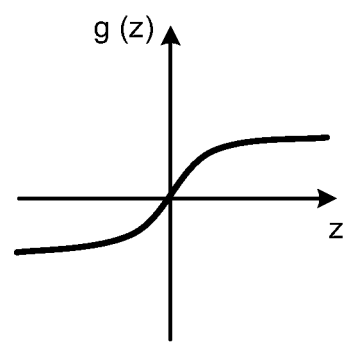
Figure 11:
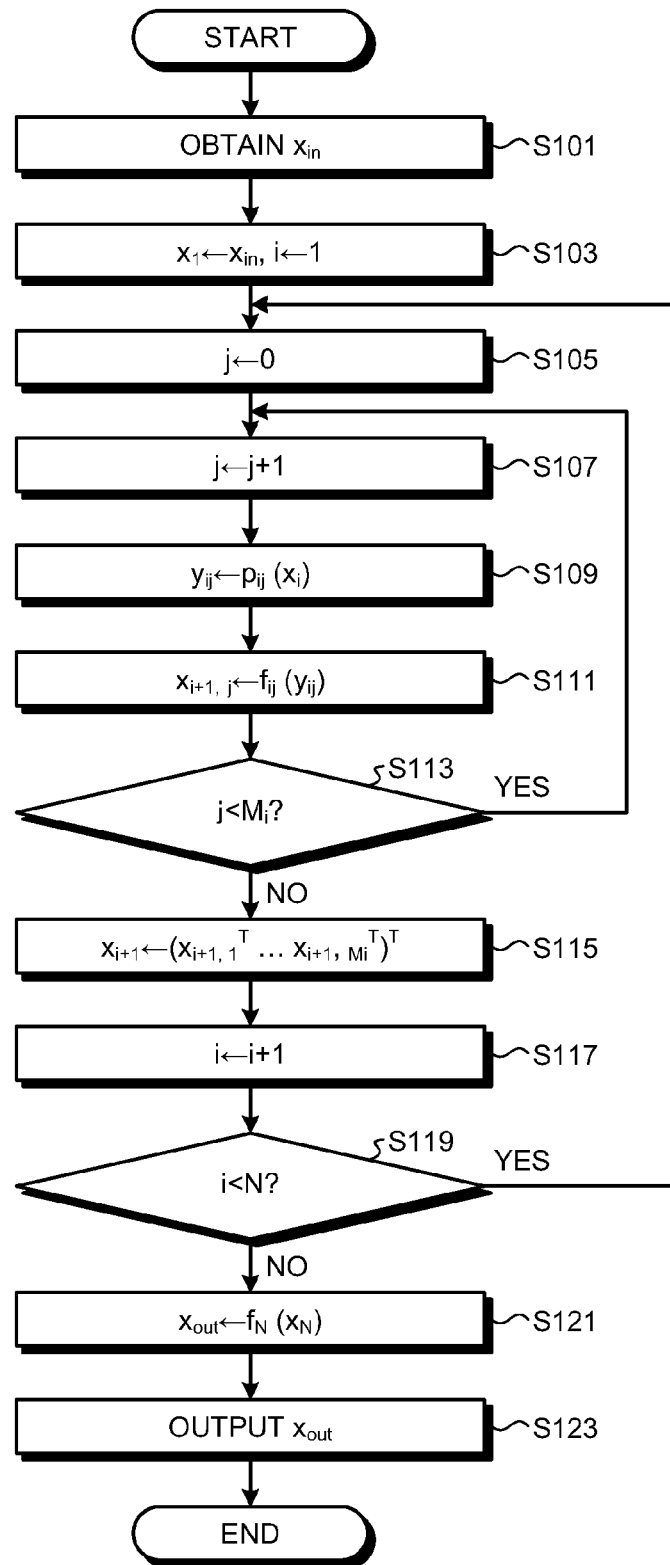
Figure 12:
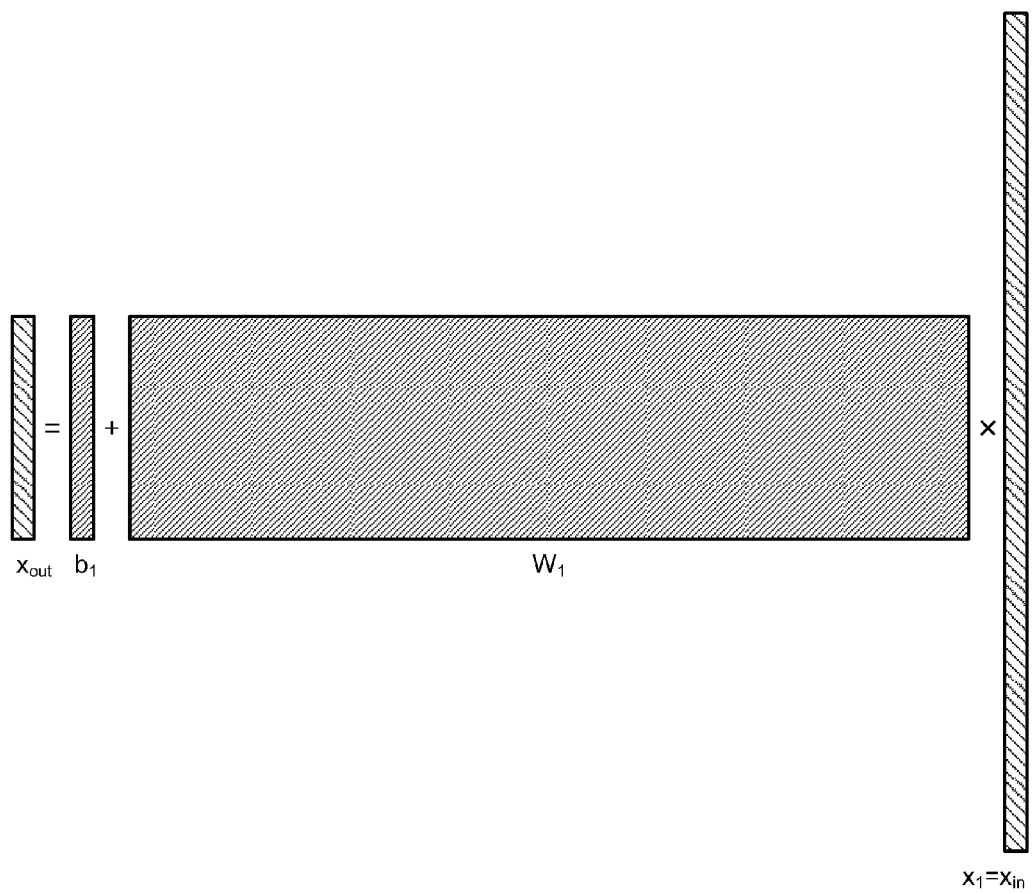
Figure 14:
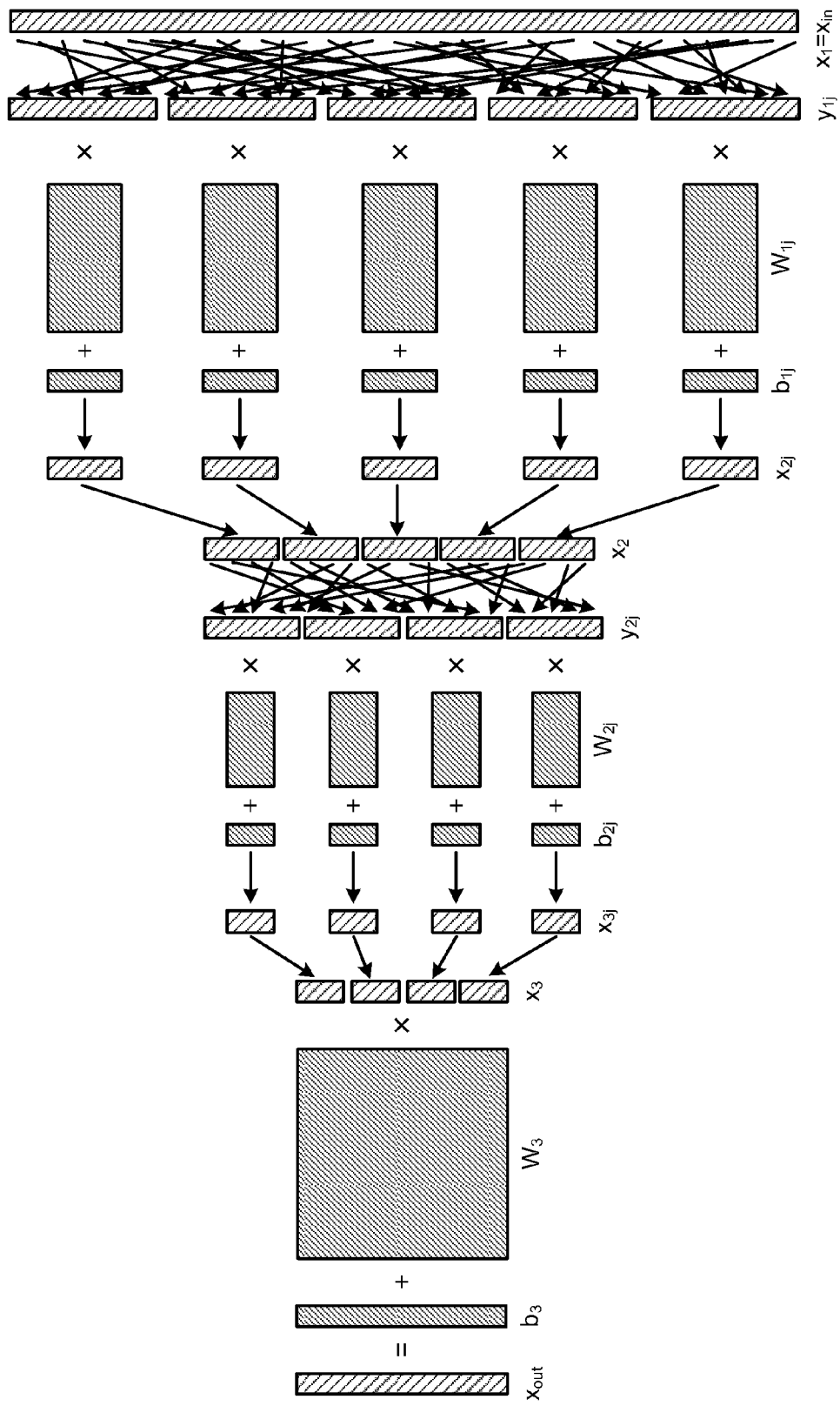
Figure 15:
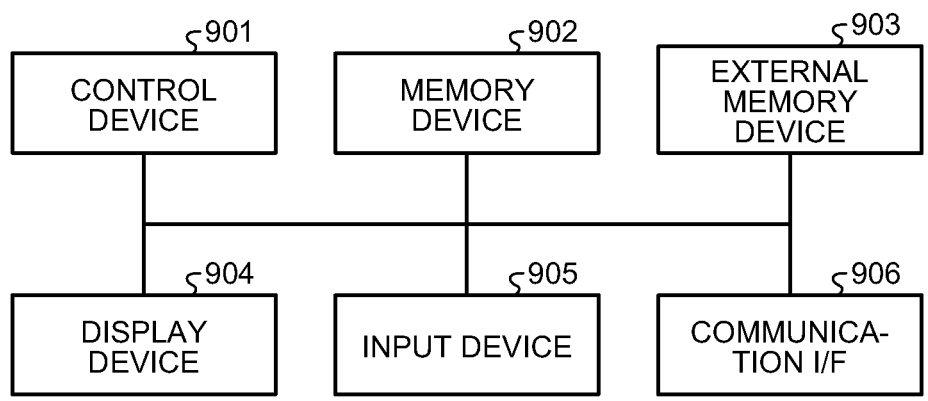

FIG. 2 is an explanatory diagram of exemplary dimension reduction performed according to the embodiment in the case in which N=2 holds true;

FIG. 3 is an explanatory diagram illustrating an exemplary method of selecting elements according to the embodiment;

FIG. 4 is an explanatory diagram illustrating an exemplary method of selecting elements according to the embodiment;

FIG. 5 is an explanatory diagram illustrating an example of first mapping according to the embodiment;

FIG. 6 is an explanatory diagram illustrating an example of first mapping according to the embodiment;

FIG. 7 is an explanatory diagram illustrating an exemplary scalar function implemented in element transformation according to the embodiment;

FIG. 8 is an explanatory diagram illustrating an exemplary scalar function implemented in element transformation according to the embodiment;

FIG. 9 is an explanatory diagram illustrating an exemplary scalar function implemented in element transformation according to the embodiment;

FIG. 10 is an explanatory diagram illustrating an exemplary scalar function implemented in element transformation according to the embodiment;

FIG. 11 is a flowchart for explaining a dimension reduction operation performed according to the embodiment;

FIG. 12 is a diagram illustrating a comparison example against the embodiment;

Figure 13:
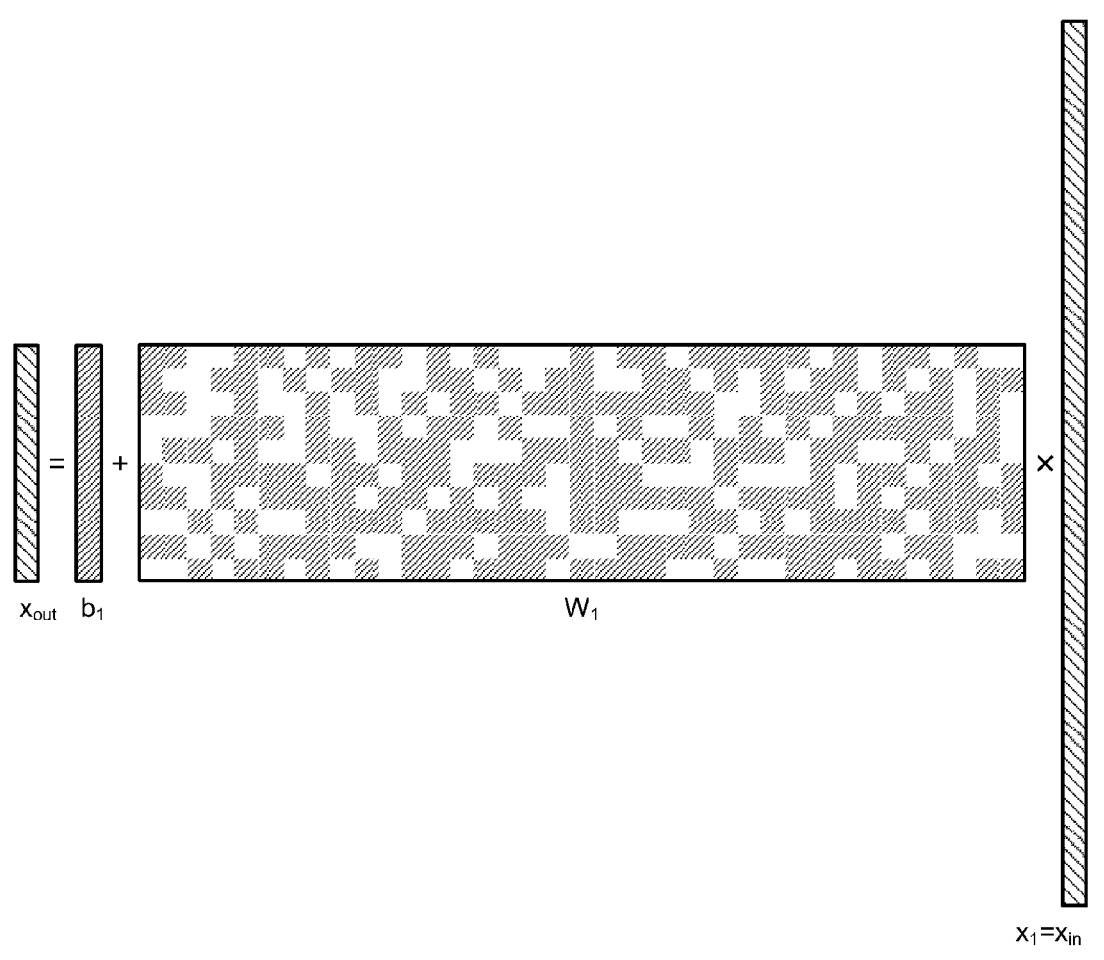

FIG. 13 is a diagram illustrating a comparison example against the embodiment;

FIG. 14 is an explanatory diagram of exemplary dimension reduction performed according to the embodiment in the case in which N=3 holds true; and FIG. 15 is a block diagram of an exemplary hardware configuration in a case in which the dimension reduction apparatus according to the embodiment is implemented using a computer.

DETAILED DESCRIPTION

According to an embodiment, a dimension reduction apparatus includes an obtaining device, a generator, a first mapping controller, a second mapping controller, and an output device. The obtaining device obtains a first vector made up of a plurality of elements. The generator generates a plurality of first partial vectors. Each of the first partial vectors is made up of one or more elements of the plurality of elements. The first mapping controller transforms each of the first partial vectors into a second partial vector by reducing number of elements constituting the first partial vector using first mapping corresponding to the first partial vector, concatenates the second partial vectors formed after transformation, and generates a second vector as a result of reducing number of dimensions of the first vector. The second mapping controller applies, with respect to the second vector, second mapping which maps the second vector into a space having number of dimensions equal to or smaller than number of dimensions of the second vector, and generates a third vector as a result of reducing the number of dimensions of the second vector to equal to or smaller than the number of dimensions of the second vector. The output device outputs the third vector.

An embodiment will be described below in detail with reference to the accompanying drawings.

Figure 1:
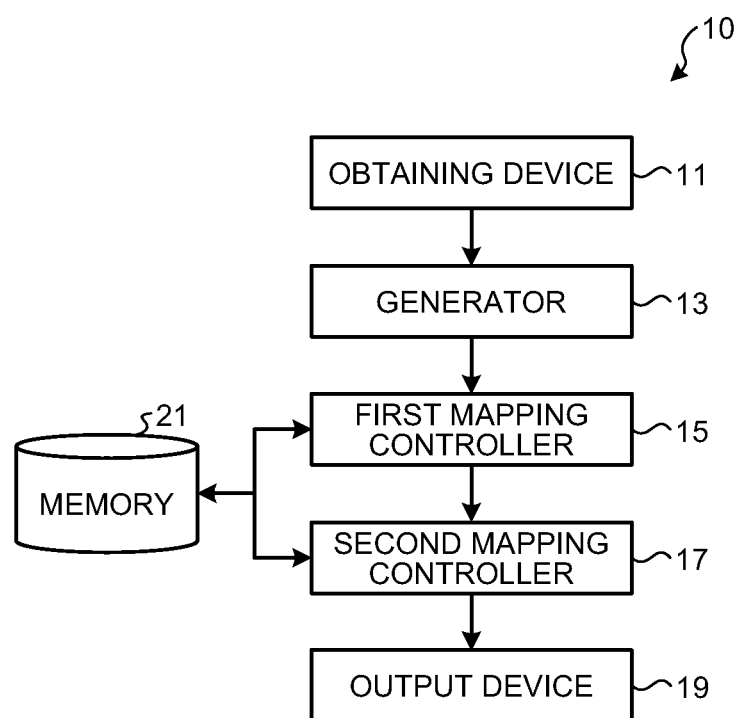
FIG. 1 is a configuration diagram illustrating an example of a dimension reduction apparatus according to an embodiment.

FIG. 1 is a configuration diagram illustrating an example of a dimension reduction apparatus 10 according to the embodiment. As illustrated in FIG. 1, the dimension reduction apparatus 10 includes an obtaining device 11, a generator 13, a first mapping controller 15, a second mapping controller 17, an output device 19, and a memory 21.

In the embodiment, it is assumed that the obtaining device 11, the generator 13, the first mapping controller 15, the second mapping controller 17, and the output device 19 are implemented using an integrated circuit (IC). However, that is not the only possible case. Alternatively, for example, the obtaining device 11, the generator 13, the first mapping controller 15, the second mapping controller 17, and the output device 19 can be implemented by executing computer programs in a processor such as a central processing unit (CPU), that is, can be implemented using software; or can be implemented using a combination of software and hardware.

In the embodiment, it is assumed that the memory 21 is implemented using a memory such as a dynamic random access memory (DRAM). However, that is not the only possible case. Alternatively, for example, the memory 21 can be implemented using a hard disk drive (HDD) or a solid state drive (SSD).

In the embodiment, it is assumed that the dimension reduction apparatus 10 is implemented using hardware such as an IC chip, a large scale integration (LSI) chip, or an application specific integrated circuit (ASIC). However, that is not the only possible case. Alternatively, for example, the dimension reduction apparatus 10 can be implemented using a computer.

The obtaining device 11 obtains a first vector made up of a plurality of elements. Herein, the first vector represents a feature vector having a higher number of dimensions as compared to a second vector (described later) or a third vector (described later). Moreover, as the first vector, it is possible to use an arbitrary high-dimensional feature descriptor that can be represented as a vector.

For example, if the image feature descriptor is taken as an example; the first vector can be in the form of an image vector, a luminance gradient direction histogram, a luminance gradient direction co-occurrence histogram, a color histogram, a color co-occurrence histogram, the Haar-like feature, or the bag-of-visual-words representation. However, the first vector is not limited to these types. Alternatively, the first vector can be a feature descriptor used in various types of pattern recognition such as speech recognition or document recognition.

The generator 13 generates a plurality of first partial vectors from the first vector that has been obtained by the obtaining device 11. More particularly, the generator 13 generates a plurality of first partial vectors each of which is made up of one or more elements of a plurality of elements constituting the first vector. Then, the generator 13 stores the first partial vectors in the memory 21.

Particularly, in the embodiment, until a plurality of first partial vectors is generated for N-1 number of times (where N is a natural number equal to or greater than two), every time a second vector is generated by the first mapping controller 15, the generator 13 generates a plurality of first partial vectors by using that second vector as the first vector; and then stores the first partial vectors in the memory 21. A second vector represents a vector generated by reducing the number of dimensions of a first vector. The details regarding the second vector are given later.

Herein, N represents the number of layers of dimension reduction (the number of times of performing dimension reduction). The generator 13 and the first mapping controller 15 perform dimension reduction for N-1 number of times, and the second mapping controller 17 performs dimension reduction only once. Thus, in all, dimension reduction is performed for N number of times. In the embodiment, the explanation is given for an example in which N=2 holds true. However, that is not the only possible case, and N can be a natural number equal to or greater than three.

FIG. 2 is an explanatory diagram of exemplary dimension reduction performed according to the embodiment in the case in which N=2 holds true. In the example illustrated in FIG. 2, $x_1$ ($x_{in}$) represents a first vector; $y_{1j}$ represent first partial vectors; $b_{1j}$ and $W_{1j}$ represent vectors and matrices, respectively, used in first mapping; $x_{2j}$ represent second partial vectors; $x_2$ represents a second vector; $b_2$ and $W_2$ represent a vector and a matrix, respectively, used in second mapping; and $x_{out}$ represents a third vector.

Herein, j represents a natural number between one and the number of first partial vectors. In the example illustrated in FIG. 2, since there are five first partial vectors, j represents a natural number between one and five. A second partial vector represents a vector generated by reducing the number of dimensions of a first partial vector. The first mapping represents mapping used for generating second partial vectors from first partial vectors. A third vector represents a vector generated by reducing the number of dimensions of a second vector. The second mapping represents mapping used for generating a third vector from a second vector. The related details are given later.

In the example illustrated in FIG. 2, when dimension reduction is performed once by the generator 13 and the first mapping controller 15, a second vector is generated from a first vector. Then, when dimension reduction is performed once by the second mapping controller 17, a third vector is generated from the second vector. Thus, in the example illustrated in FIG. 2, two-layered dimension reduction is performed.

The generator 13 generates a plurality of first vectors by selecting, according to a predetermined method, each of a plurality of elements for one or more first partial vectors from among a plurality of first partial vectors. That is, the generator 13 generates a plurality of first partial vectors by making use of all of a plurality of elements. In practice, each of a plurality of elements has an index assigned thereto. Hence, the generator 13 selects the index to select the corresponding element.

As illustrated in FIG. 3, the generator 13 can select each of a plurality of elements constituting the first vector ($x_i$) for any one of a plurality of first partial vectors ($y_{ij}$). In this case, the total number of elements constituting a plurality of first partial vectors becomes equal to the total number of elements constituting the first vector.

Alternatively, as illustrated in FIG. 4, the generator 13 can select each of a plurality of elements constituting the first vector ($x_i$) for one or more first partial vectors from among a plurality of first partial vectors ($y_{ij}$). In this case, the total number of elements constituting a plurality of first partial vectors becomes equal to or greater than the total number of elements constituting the first vector. That is, if all of the elements are used, the generator 13 can select the same element in a duplicate manner.

Meanwhile, the predetermined method mentioned above can be random selection, or can be selection using machine learning (pre-training) based on an evaluation criterion such as error minimization, or can be hard-coded selection.

Moreover, it is desirable that each of a plurality of first partial vectors has a substantially identical total number of elements. However, that may not be the case. Particularly, in the case of hard-coded selection, a plurality of first partial vectors can have a uniform total number of elements or can have unevenness in the total number of elements.

Meanwhile, in the embodiment, it is assumed that N=2 holds true. Hence, in the examples illustrated in FIGS. 3 and 4, i=1 holds true.

The first mapping controller 15 transforms each first partial vector, which is generated by the generator 13, into a second partial vector by reducing the number of elements of that first partial vector using first mapping corresponding to that first partial vector. Then, the first mapping controller 15 concatenates a plurality of post-transformation second partial vectors to generate a second vector, which represents a vector generated by reducing the number of dimensions of the first vector; and stores the second vector in the memory 21.

Particularly, in the embodiment, every time a plurality of first partial vectors is generated by the generator 13, the first mapping controller 15 generates a second vector from the first partial vectors according to the method described above, and stores that second vector in the memory 21. Meanwhile, the parameters used in the first mapping, namely, the first vectors the vectors $y_{1j}$, and the matrices $W_{1j}$ are stored in the memory 21.

Herein, the parameters used in the first mapping (the vectors $b_{1j}$ and the matrices $W_{1j}$) can be determined using various machine learning techniques (ex. optimization technique). For example, using the framework of an hourglass-shaped neural network, learning can be performed in such a way that the error between an input vector and an output vector becomes small. Alternatively, learning can be performed one layer at a time as is the case of the well-known autoencoder network, and lastly parameter tuning can be performed for all N number of layers. Still alternatively, it is also possible to make use of supervised learning in which samples having pairs of feature vectors and class labels are used. As supervised learning; for example, it is possible to use the framework of "Efficient Object Category Recognition Using Classmates," L. Torressani et. al., ECCV2010 or to use the framework of "Random Ensemble Metrics for Object Recognition," T. Kozakaya et al., ICCV2011. Aside from the examples mentioned herein, it is also possible to implement the frameworks of various dimension reduction learning methods.

More particularly, with respect to the first partial vectors generated by the generator 13, the first mapping controller 15 performs the first mapping using vectors for first mapping and matrices for first mapping corresponding to the first partial vectors; and transforms the first partial vectors into second partial vectors. Herein, as illustrated in FIG. 5 and given in Equation (1), it is desirable that the first mapping is affine mapping. However, that is not the only possible case. Alternatively, as illustrated in FIG. 6 and given in Equation (2), it is possible to use a combination of affine mapping and element transformation $g_{ij}$, or it is possible to perform mapping to a kernel space using a kernel function as is commonly well-known in the field of pattern recognition.

$$x_{i+1,j}=f_{ij}(y_{ij})=b_{ij}+W_{ij}y_{ij} \quad (1)$$

$$x_{i+1,j}=f_{ij}(y_{ij})=g_{ij}(b_{ij}+W_{ij}y_{ij}) \quad (2)$$

Herein, $W_{ij}$ used in the first mapping represents a matrix; and $b_{ij}$ used in the first mapping represents a vector. However, the vector $b_{ij}$ can be omitted. In that case, Equation (1) represents linear mapping, and Equation (2) represents a combination of linear mapping and element transformation.

Meanwhile, element transformation $g_{ij}$ represents independent transformation of each element constituting a first partial vector. In the transformation applied to each element, an arbitrary function such as a linear function or a nonlinear function can be used. For example, it is possible to use identity mapping illustrated in FIG. 7, or to use a piecewise linear function illustrated in FIG. 8, or to use a sigmoid function illustrated in FIG. 9, or to use a tan h function illustrated in FIG. 10.

For example, since the operation of the sigmoid function is like threshold processing, it has the effect of transforming a quantitative value into a qualitative value. Moreover, if the first partial vectors (the first vector) represent the image feature descriptor, it is often the case that qualitative values (such as presence or absence of edges) represent more effective information for recognition than qualitative values (such as the edge strengths in an image). For that reason, if the elements are transformed using element transformation $g_{ij}$, that is, if the first partial vectors are transformed into second partial vectors using element transformation $g_{ij}$; then the second partial vectors can be used as more effective information for recognition.

However, the arbitrary scalar function is not limited to the abovementioned functions. Alternatively, it is also possible to use a polynomial function, a trigonometric function, an exponent function, or a logarithmic function.

Meanwhile, in the embodiment, it is assumed that N=2 holds true. Hence, in the examples illustrated in FIGS. 5 and 6 and given in Equation (1) and Equation (2), i=1 holds true.

With respect to a second vector generated by the first mapping controller 15, the second mapping controller 17 applies the second mapping that maps the second vector into a space having the number of dimensions equal to or smaller than the number of dimensions of that second vector; and generates a third vector by reducing the number of dimensions of the second vector to equal to or smaller than the number of dimensions of the space. Particularly, in the embodiment, the second mapping controller 17 generates a third vector from the second vector that is lastly generated by the first mapping controller 15. Meanwhile, the parameters used in the second mapping, namely, the second vector $x_2$, the vector $b_2$, and the matrix $W_2$ are stored in the memory 21. Herein, in an identical manner to the first mapping, the parameters used in the second mapping (the vector $b_2$ and the matrix $W_2$) can be determined using various machine learning techniques (ex. optimization technique).

More particularly, with respect to the second vector generated by the first mapping controller 15, the second mapping controller 17 performs the second mapping using the vector $b_2$ for second mapping and the matrix $W_2$ for second mapping; and transforms the second vector into a third vector. Herein, in an identical manner to the first mapping, it is desirable that the second mapping is affine mapping. However, that is not the only possible case. Alternatively, it is possible to use a combination of affine mapping and element transformation $g_2$, or it is possible to perform mapping to a kernel space using a kernel function.

The output device 19 outputs the third vector that is generated by the second mapping controller 17.

FIG. 11 is a flowchart for explaining an exemplary sequence of operations during a dimension reduction operation performed in the dimension reduction apparatus 10 according to the embodiment.

Firstly, the obtaining device 11 obtains a first vector $x_{in}$ that is the target for dimension reduction (Step S101), and initializes $x_1$ to $x_{in}$ and initializes the variable i to 1 (Step S103).

Then, the generator 13 initializes the variable j to 0 (Step S105), and then updates the variable j to j+1 (Step S107).

Subsequently, the generator 13 selects elements from the first vector $x_i$ using a function $p_{ij}$, and generates first partial vectors $y_{ij}$ (Step S109). Herein, the function $p_{ij}$ is an example of the predetermined method mentioned above.

Then, the first mapping controller 15 applies first mapping $f_{ij}$ to the first partial vectors $y_{ij}$ and generates second partial vectors $x_{i+1, j}$ (Step S111).

Subsequently, while $j<M_i$ holds true (Yes at Step S113), the operations from Steps S107 to S111 are repeated. Herein, $M_i$ is a natural number equal to or greater than two, and represents the number of first partial vectors generated from the first vector.

When $j \geq M_i$ is satisfied (No at Step S113), the first mapping controller 15 concatenates the second partial vectors from the second partial vector $x_{i+1, 1}$ to the second partial vector $x_{i+1, Mi}$; and generates a second vector $x_{i+1}$ (Step S115).

Then, the first mapping controller 15 updates the variable i to i+1 (Step S117).

Subsequently, while i<N holds true (Yes at Step S119), the operations from Steps S105 to S117 are performed in a repeated manner. Herein, as described above, N represents the number of layers of dimension reduction (the number of times of performing dimension reduction).

When $i \geq N$ is satisfied (No at Step S119), the second mapping controller 17 applies second mapping $f_N$ to the second vector $x_N$ that is lastly generated by the first mapping controller 15; and generates a third vector $x_{out}$ (Step S121).

Subsequently, the output device 19 outputs the third vector $x_{out}$ (Step S123).

The explanation till now was about the configuration and the operations of the dimension reduction apparatus 10 according to the embodiment. Given below is the explanation about the fact that using the dimension reduction apparatus 10 enables achieving high-speed dimension reduction with a low memory capacity.

Herein, as an example, assume that the first vector that is input has 50000 dimensions, and the third vector that is output has 500 dimensions. Moreover, assume that the number of layers N is equal to two (implying two-layered dimension reduction), and that the first mapping as well as the second mapping is affine mapping. Furthermore, assume that a number $M_1$ of the first partial vectors is equal to 50, and the number of selections during element selection for each first partial vector is identical without allowing duplicate selection. Thus, for each first partial vector, the number of dimensions becomes 50000/50=1000. Moreover, assume that, in the first mapping, transformation to a vector having 500/$M_1$=10 dimensions is performed for all j. Accordingly, the number of dimensions of the second vector $x_2$ becomes 500, and the second mapping represents affine mapping from 500 dimensions to 500 dimensions.

In the conventional method of using principal component analysis to perform dimension reduction in such a way that the error of mean square around the time of performing dimension reduction is the smallest, and in the method described in H. Zou, T. Hastie and R. Tibshirani, "Sparse Principal Component Analysis," Journal of Computational and Graphical Statistics, Vol. 15, No. 2, pp. 265-286, 2006; a matrix operation with respect to a high-dimensional feature vector is performed only once as illustrated in FIG. 12 and FIG. 13, respectively. Hence, such dimension reduction can be said to be one-layered dimension reduction. Herein, FIGS. 12 and 13 are diagrams illustrating comparison examples against the embodiment. In the conventional method of using principal component analysis (see FIG. 12), the number of parameters used in mapping is 500+500×50000≈25 million.

In contrast, in the method according to the embodiment, the number of parameters used in the first mapping is 50×(10+10×1000)≈0.5 million, and the number of parameters used in the second mapping is 500+500×500≈0.25 million. Thus, in all, it is sufficient to hold only 0.75 million parameters.

Thus, in the method according to the embodiment, it is sufficient to have the amount of memory equal to only three-hundredths of the conventional technology, thereby indicating that a low memory capacity can be achieved. Moreover, in the method according to the embodiment, the number of times of performing multiplication is also equal to only three-hundredths of the conventional technology. Besides, in the method according to the embodiment, every affine mapping can be allocated in a continuous manner in the memory. Therefore, it indicates that high-speed dimension reduction can be achieved as compared to the conventional technology.

In this way, in the embodiment, the number of parameters used in mapping can be reduced to a large extent. That leads to achieving reduction in the amount of memory and reduction in the number of times of performing multiplication. As a result, it becomes possible to achieve high-speed dimension reduction with a low memory capacity.

Moreover, in the method according to the embodiment, the generator 13 makes use of all of a plurality of elements constituting a first vector, and generates a plurality of first partial vectors. Hence, a plurality of first partial vectors happens to contain all the information included in the first vector. For that reason, in the method according to the embodiment, it becomes possible to prevent a situation in which dimension reduction is accompanied by a loss of effective information for recognition. That is, dimension reduction can be achieved while keeping the effective information for recognition.

Meanwhile, as described above, in the embodiment, the explanation is given for two-layered dimension reduction. However, alternatively, it is also possible to perform dimension reduction over three or more layers. For example, three-layered dimension reduction is performed in the manner illustrated in FIG. 14.

Hardware Configuration

FIG. 15 is a block diagram of an exemplary hardware configuration in the case in which the dimension reduction apparatus 10 according to the embodiment is implemented using a computer. As illustrated in FIG. 15, the dimension reduction apparatus 10 has the hardware configuration of a commonly-used computer that includes a control device 901 such as a central processing unit (CPU); a memory device 902 such as a read only memory (ROM) or a random access memory (RAM); an external memory device 903 such as a hard disk drive (HDD) or a solid state drive (SSD); a display device 904 such as a display; an input device 905 such as a mouse or a keyboard; and a communication I/F 906.

In this case, the computer programs executed in the dimension reduction apparatus 10 are recorded in the form of installable or executable files in a computer-readable recording medium such as a compact disk read only memory (CD-ROM), a compact disk readable (CD-R), a memory card, a digital versatile disk (DVD), or a flexible disk (FD).

Alternatively, the computer programs executed in the dimension reduction apparatus 10 can be saved as downloadable files on a computer connected to the Internet or can be made available for distribution through a network such as the Internet.

Still alternatively, the computer programs executed in the dimension reduction apparatus 10 can be stored in advance in a ROM.

In this case, the computer programs executed in the dimension reduction apparatus 10 contain a module for each of the abovementioned constituent elements to be implemented in a computer. As the actual hardware, for example, the control device 901 reads the computer programs from the external memory device 903 and runs them such that the computer programs are loaded in the memory device 902. As a result, the module for each of the abovementioned constituent elements is implemented in the computer.

As explained above, according to the embodiment, it becomes possible to achieve high-speed dimension reduction with a low memory capacity.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A dimension reduction apparatus comprising:
a memory; and
processing circuitry configured to,
obtain a first vector made up of a plurality of elements;
generate a plurality of first partial vectors, each of the first partial vectors being made up of one or more elements of the plurality of elements;
transform each of the first partial vectors into a second partial vector by reducing number of elements constituting the first partial vector using first mapping corresponding to the first partial vector, concatenate the second partial vectors formed after transformation, and generate a second vector as a result of reducing number of dimensions of the first vector;
apply, with respect to the second vector, second mapping which maps the second vector into a space having number of dimensions equal to or smaller than number of dimensions of the second vector, and generate a third vector as a result of reducing the number of dimensions of the second vector to equal to or smaller than the number of dimensions of the second vector; and
output the third vector.

2. The apparatus according to claim 1, wherein
until the plurality of first partial vectors is generated for N-1 number of times where N is a natural number equal to or greater than two, every time the second vector is generated by the first mapping controller, the processing circuitry generates the plurality of first partial vectors by using the second vector as the first vector,
every time the plurality of first partial vectors are generated, the processing circuitry generates the second vector from the plurality of first partial vectors, and generates the third vector from the second vector which is lastly generated.

3. The apparatus according to claim 1, wherein the processing circuitry generates the plurality of first partial vectors by selecting, according to a predetermined method, each of the plurality of elements for one or more first partial vectors from among the plurality of first partial vectors.

4. The apparatus according to claim 3, wherein the predetermined method is random selection.

5. The apparatus according to claim 1, wherein the first mapping and the second mapping are affine mapping.

6. The apparatus according to claim 1, wherein the first mapping is affine mapping and transformation using a scalar function.

7. The apparatus according to claim 6, wherein the scalar function is a nonlinear function or a linear function.

8. The apparatus according to claim 7, wherein the nonlinear function is at least one of a piecewise linear function, a sigmoid function, and a tan h function.

9. A dimension reduction method employed in a dimension reduction apparatus configured to include a memory and processing circuitry, comprising:
obtaining, by the processing circuitry, a first vector made up of a plurality of elements;
generating, by the processing circuitry, a plurality of first partial vectors, each of the first partial vectors being made up of one or more elements of the plurality of elements;
transforming each of the first partial vectors into a second partial vector by reducing number of elements constituting the first partial vector using first mapping corresponding to concerned first partial vector, concatenating the second partial vectors formed after transformation, and generating a second vector as a result of reducing number of dimensions of the first vector, by the processing circuitry;
applying, with respect to the second vector, second mapping which maps the second vector into a space having number of dimensions equal to or smaller than number of dimensions of the second vector, and generating a third vector as a result of reducing the number of dimensions of the second vector to equal to or smaller than the number of dimensions of the second vector, by the processing circuitry; and
outputting, by the processing circuitry, the third vector.

10. A computer program product comprising a non-transitory computer readable medium including programmed instructions, wherein the instructions, when executed by a computer, cause the computer to perform:
obtaining a first vector made up of a plurality of elements;
generating a plurality of first partial vectors, each of the first partial vectors being made up of one or more elements of the plurality of elements;
transforming each of the first partial vectors into a second partial vector by reducing number of elements constituting the first partial vector using first mapping corresponding to concerned first partial vector, concatenating the second partial vectors formed after transformation, and generating a second vector as a result of reducing number of dimensions of the first vector;
applying, with respect to the second vector, second mapping which maps the second vector into a space having number of dimensions equal to or smaller than number of dimensions of the second vector, and generating a third vector as a result of reducing the number of dimensions of the second vector to equal to or smaller than the number of dimensions of the second vector; and
outputting the third vector.

* * * * *